United States Patent [19]
Doak

[11] Patent Number: 5,241,418
[45] Date of Patent: Aug. 31, 1993

[54] KALEIDOSPHERE

[76] Inventor: Donald A. Doak, 215 Andre, Mount Pleasant, Mich. 48858

[21] Appl. No.: 915,538

[22] Filed: Jul. 20, 1992

[51] Int. Cl.$^5$ .............................................. G02B 23/00
[52] U.S. Cl. .................................................. 359/616
[58] Field of Search ................ 359/616, 617, 850, 861

[56] References Cited

U.S. PATENT DOCUMENTS

| | | | |
|---|---|---|---|
| 1,394,480 | 10/1921 | Fearn | 359/616 |
| 1,518,204 | 12/1924 | Husted | 359/617 |
| 2,066,548 | 1/1937 | Thompson | 359/616 X |
| 3,020,796 | 2/1962 | Kaplan | 359/616 |
| 3,160,056 | 12/1964 | Taylor | 359/616 |
| 3,357,768 | 12/1967 | Cox et al. | 359/616 |
| 3,809,879 | 5/1974 | Gonzalez | 359/616 |
| 4,061,414 | 12/1977 | Price | 359/616 |
| 4,475,126 | 10/1984 | Akins | 359/616 X |
| 4,793,671 | 12/1988 | Polochak et al. | 359/616 |
| 4,998,789 | 3/1991 | Atkins | 459/616 |

Primary Examiner—Richard A. Wintercorn
Attorney, Agent, or Firm—Ian C. McLeod

[57] ABSTRACT

A kaleidospherical device (10) made of a plurality of elongate, tapered tubes (12) and (14) bundled into a geodesically ordered arrangement, is described. The tubes are preferably comprised of three planar mirrors (22, 24 and 26) mounted together to form a triangular cross-section that is approximately, but not quite equilateral. The tubes taper along their length from a small end to a large end where the bundle of tubes forms a geodesic shape. The reflective surfaces of the three mirrors forming the tube face each other. That way, when an object to be viewed is placed adjacent the small end of the bundle, the tapered tubes form a reflection of the object as a spherical image positioned inside the kaleidosphere. The kaleidosphere (60) can be made as a hemispherically shaped member that mounts on a cabinet (62) for projecting a movie image or an image created by an object wheel (82) into the kaleidosphere. The kaleidosphere (96) can also serve as a lamp (90) or a chandelier.

14 Claims, 3 Drawing Sheets

KALEIDOSPHERE

BACKGROUND OF THE INVENTION (1) Field of the Invention

The present invention relates to a kaleidosphere. In particular, the present invention relates to a kaleidospherical device preferably having the appearance of at least a portion of three-dimensional, geodesic sphere and comprised of a plurality of tapered, three-sided tubes. Each tube has a large, viewing end and a small, open end forming an opening along the length of the tube. The inner surface of the tubes are reflective. The tubes are then bundled or group into a geodesically ordered arrangement having the taper of the tubes facing in a similar direction with adjacent tubes having their sides in contiguous abutting engagement. The bundle thus forms a kaleidosphere or a portion thereof having the shape of a geodesic device at the large end of the tubes. Placing an object to be viewed at the small end of the bundle forms an image of the object at the viewing end appearing as an inner spherical image positioned inside the kaleidosphere. When the object is moved or rotated, the image seen from the viewing end of the kaleidosphere will change in a swirling motion.

The kaleidosphere can be small enough to be held and rotated in a person's hand or it can be large enough to comprise a steel and glass geosphere used in a structural setting. Furthermore, the kaleidosphere can also serve as a piece of furniture, or as a work of art that can be enjoyed when viewed from afar.

(2) Prior Art

The prior art has described various types of kaleidoscopic devices that are typically comprised of a mirror configuration mounted in a housing. A sight aperture at one end of the housing enables a viewer to sight along the mirrors to see the pattern of an object to be viewed having the appearance of a multi-faceted image or design. A light source can also be used to enhance the image. The problem is that these types of kaleidoscopes need to be held close to the viewers eye to be appreciated and they do not provide a unique looking spherical image appearing to be positioned inside the kaleidoscope in a similar manner to the present invention.

A number of these prior art kaleidoscopic devices use a V-shaped mirror configuration formed by two mirrors having adjacent sides joined together and mounted in a housing. This type of kaleidoscopic device is illustrated in U.S. Pat. Nos. Re. 26,031 to Burnside III; 66,134 to Earnshaw; 132,978 to Pool; 151,005 to Bush; 243,537 to Farr: 407,937 to Lovibond; 1,518,204 to Husted; 2,066,548 to Thompson and 3,160,056 to Taylor. The mirror configurations in these devices are not tapered and the design formed is that of a multi-faceted image. These kaleidoscopes also require that the viewer place his eye close to a viewing aperture in the housing to appreciate the image formed. U.S. Pat. No. 1,394,480 to Fearn shows a plurality of V-shaped mirror units joined together around the circumference of a circular housing to form the general effect of a star.

U.S. Pat. No. 3,357,768 to Cox et al describes a two mirror apparatus with the mirrors hinged together at an apex of the mirrors. The mirrors can then be moved inwardly, towards each other or outwardly, away from each other to form three-dimensional images. This apparatus is adapted for viewing a swatch of fabric material to simulate a rug design.

U.S. Pat. No. 4,061,414 to Price shows the use of multiple units of mirrors mounted together in a housing to form a kaleidoscopic device. The mirror units comprise a variety of geometric shapes such as squares, rectangles and equilateral triangles joined to form a hexagonal shape or to form a corrugated, sawtooth configuration. The housing is provided with a front and a rear viewing aperture for looking at the multi-faceted image of an object distorted by the various mirror configurations. The mirrors are not described as being tapered.

Several prior art kaleidoscopic devices that do use tapered mirror configurations are described in U.S. Pat. Nos. 862,438 to Boehm; 3,020,796 to Kaplan and 3,809,879 to Gonzalez. These devices generally use three trapezoidally shaped mirrors, with each mirror joined to its adjacent mirror to form a tapered reflective tube having a first, large end and a second, smaller end. The tube is then mounted in a housing having a viewing aperture. Typically, an observer looks through the viewing aperture to sight down the reflective tube from one of the ends to view an object placed at the other end.

There is no suggestion in the prior art of the use of a plurality of tapered tubes bundled together in an ordered geodesic arrangement to form a kaleidospherical device. The problem has always been that it is difficult to construct a bundle of tapered tubes into a geometrically ordered arrangement having more than one layer. The physical thickness of the planar members comprising the tubes makes it difficult to build the kaleidosphere.

U.S. Pat. No. 4,475,126 to Akins shows a visual display apparatus comprised of four mirrors arranged to form a tapered tube that diverges outwardly, away from the image of a television screen. The mirrors have their reflective surfaces facing inwardly and create an illusion that the image on the television screen has a spherical, polyhedral or some other three-dimensional shape. In FIGS. 5 and 6, Akins describes an embodiment having a plurality of visual display apparatus arranged so that the tapered mirror array for each apparatus is positioned adjacent its neighbor to form a circular arrangement of contiguous arrays. With the use of a corresponding number of television screens, the same image or a different image may be displayed on each visual display apparatus, around the annular extent of the apparatus. However, Akins makes no suggestion of the visual appeal provided by bundling a plurality of three-sided, tapered tubes together into a geodesically ordered arrangement to form a kaleidosphere.

Finally, Kenner discusses the mathematics of geodesic objects in *Geodesic Math and How to Use It*, published by University of California Press, 1976.

What is thus needed is a mirrored device comprised of a plurality of three-sided tapered tubes bundled together in a geodesically ordered arrangement to form a kaleidosphere. When there are provided only enough tubes to form a partial sphere and an object to be viewed is placed adjacent the smaller end of the tubes, the object forms an image at the large, viewing end of the kaleidosphere having the appearance of an inner sphere positioned inside the kaleidosphere. A person wishing to view the object can do so from afar and no matter what direction or position the viewing end of the kaleidosphere is looked at, the illusion of the inner sphere inside the kaleidosphere is maintained. The kaleidosphere can thus be viewed and appreciated by a large number of people at once and it can serve either as a work of art or as a piece of decorative furniture. The kaleidosphere can also be provided in the shape of a complete sphere and serve as a lamp, a chandelier or a reflective sphere hung from a ceiling.

OBJECTS

It is therefore an object of the present invention to provide a kaleidosphere device comprised of a plurality of three-sided tubes bundled together in an ordered, geodesic arrangement. Further, it is an object of the present invention to provide a kaleidosphere device that can be simultaneously viewed and appreciated by a number of people from afar. Still further, it is an object of the present invention to provide a kaleidosphere device that can be hand held or large enough to comprise a geosphere used in a structural setting, and that can also serve as a piece of decorative furniture and as a work of art. Finally, it is an object of the present invention to provide a kaleidosphere device having a geodesic shape at a first, viewing end so that when an object to be viewed is placed at a second end of the device, the object projects an image having the appearance of an inner sphere positioned inside the kaleidosphere. These and other objects will become increasingly apparent by reference to the following descriptions and to the drawings.

IN THE DRAWINGS

FIG. 1 is an isometric view of a kaleidosphere 10 of the present invention made from a geodesically ordered arrangement of reflective tubes 12 and 14.

FIG. 2 is a perspective view of a portion of the kaleidosphere 10 shown in FIG. 1.

FIG. 3 is a front, elevated view of a representative reflective tube 20 of the present invention comprised of reflective mirrors 22, 24 and 26.

FIG. 4 is a perspective view of a second embodiment of a reflective tube 40 of the present invention.

FIG. 5 is a left side, elevational view of a hemispherically shaped kaleidosphere 60 mounted on a cabinet 62 that provides for projecting an image created by an object wheel 82 onto the kaleidosphere 60.

GENERAL DESCRIPTION

Figure 1:
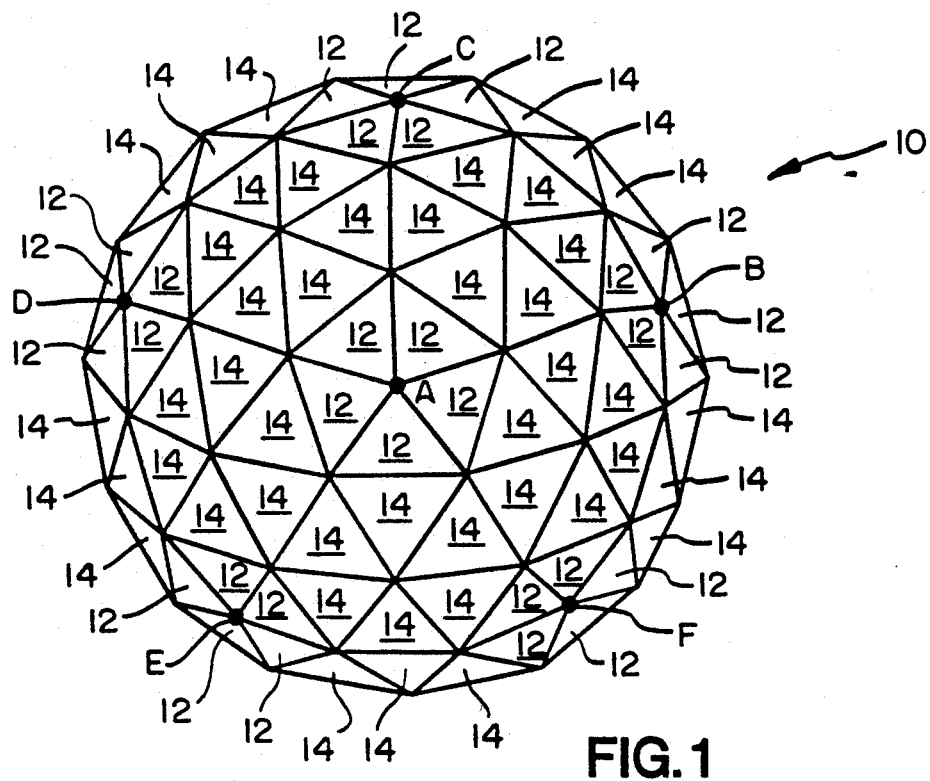

The present invention relates to a kaleidospheric device for viewing a reflection of an object to be viewed, which comprises: at least two open and reflective, tubes, comprised of a plurality of planar members having an outside sidewall and an inner reflective surface facing each other within the reflective tube and with each tube having a large, open viewing end tapering along a length of the tube to a small, open end having a cross-section similar in shape but smaller in area than the large viewing end and wherein the reflective tubes are bundled together with the taper of the tubes aligned in a similar direction so that adjacent outside sidewalls of adjacent tubes are in a contiguous abutting engagement to form a geodesically ordered arrangement of the tubes comprising the shape of at least a partial geosphere as seen at the large end of the tubes, wherein with the object to be viewed placed adjacent the bundle at the small end of the tubes, the reflection of the object at the viewing end of the tubes has the appearance of an image positioned inside the kaleidospheric device.

Further, the present invention relates to a kaleidospheric device for viewing a reflection of an object to be viewed, which comprises: at least two open and reflective, three-sided tubes comprised of a plurality of planar members having an outside sidewall and an inner reflective surface facing each other within the reflective tube and with each tube having a large, open viewing end tapering along a length of the tube to a small, open end having a cross-section similar in shape but smaller in area than the large viewing end and wherein the plurality of reflective tubes are bundled together with the taper of the tubes aligned in a similar direction so that adjacent outside sidewalls of adjacent tubes are in a contiguous abutting engagement to form a geodesically ordered arrangement of the tubes comprising the shape of at least a partial geosphere as seen at the large end of the tubes, wherein with the object to be viewed placed adjacent the bundle at the small end of the tubes, the reflection of the object at the viewing end of the tubes has the appearance of a spherical image positioned inside the kaleidospheric device. Finally, the present invention relates to a reflective tube that is shaped to form an integral part of a kaleidosphere, which comprises: three planar members that are symmetrically positioned so that each mirror intersects its adjacent mirror to form a triangular cross-section of the tube with the planar members having an outside sidewall and an inner reflective surface facing each other within the reflective tube and with the tube having a large, open viewing end tapering along a length of the tube to a small, open end having a cross-section similar in shape but smaller in area than the large end, wherein the intersection of any two adjacent planar members forming the tube comprise a portion of a radii of a sphere enclosing the kaleidosphere with an outer radial extent of the intersection at the large end of the tube forming a surface point on the sphere so that the tube thereby forms an integral part of the kaleidosphere surrounded by the sphere and wherein with an object to be viewed placed adjacent to the small end of the tube, a reflection of the object at the viewing end of the tube has the appearance of an image positioned inside the tube.

SPECIFIC DESCRIPTION

Figure 2:
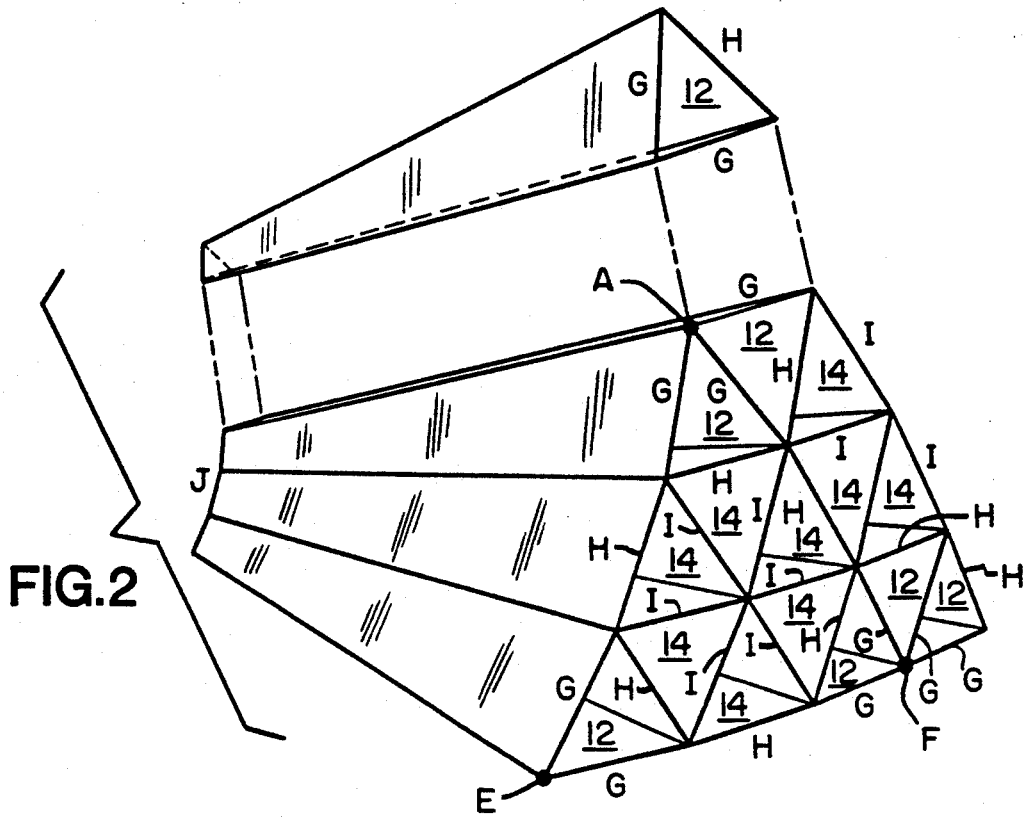
Figure 3:
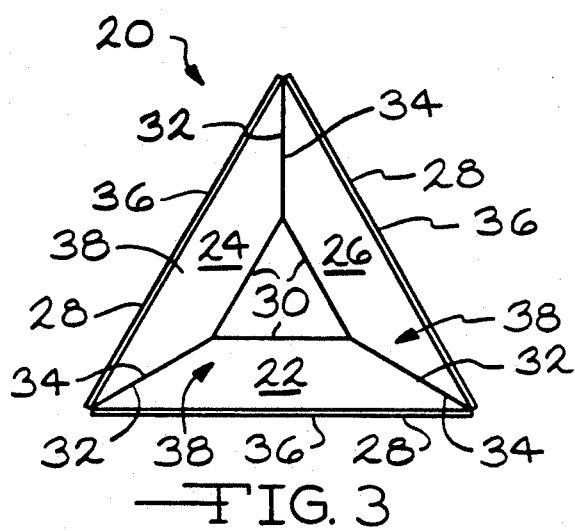

FIGS. 1 to 3 show one preferred embodiment of the kaleidosphere 10 of the present invention. The kaleidosphere 10 is a derivative of a geodesic sphere. In that respect, the kaleidosphere 10 will be first described in terms of the geometry that supports the structure of a geodesic sphere. Although many different geodesic structures are contemplated by the scope of the present invention, the geodesic structure shown in FIG. 1 is formed by geometrically dividing a sphere into a complex polyhedron having 20 great triangles forming an icosahedron. Several of the great triangles are described as triangles ABC, ACD, ABF, ADE and AEF. The three sides comprising each great triangle are divided into three equal segments. The points delineating the segments are then connected to subdivide each great triangle into nine smaller triangles. Dividing each side of the great triangle delineates the kaleidosphere 10 as a three frequency icosahedron (3ν icosa). The resulting nine smaller triangles forming each great triangle are comprised of two types of triangles 12 and 14. The triangularly cross-sectioned tubes 12 and 14 are approximately, but not quite equilateral in cross-section in one form as constructed.

It should be understood that in the kaleidosphere 10 of the present invention, the triangles are actually the front end of mirrors forming triangularly cross-sectioned tapered tubes 12 and 14 as shown in FIG. 3. If the mirrors comprising the tubes 12 and 14 were to be extended in length, they would meet at a center point for the kaleidosphere 10. Therefore, despite the distortions in FIG. 1, all the tubes 12 have a similar shape and all the tubes 14 have a similar shape.

Although the kaleidosphere 10 shown in FIG. 1 is a $3v$ icosa kaleidosphere 10, the smallest number of triangular cross-sectioned tubes 12, 14 that is needed to form a basic building block of the kaleidosphere 10 is two (2), comprised of one tube 12 and one tube 14 mounted back to back. On the other hand, the tubes 12, 14 of the kaleidosphere 10 can be subdivided literally an infinite number of times to form a multi-tubular device.

FIG. 3 shows a representative tube 20 that depicts the construction of either of the tubes 12 or 14. The tube 20 is comprised of a first mirror 22, a second mirror 24 and a third mirror 26. The mirrors 22, 24 and 26 are planar members, each having a trapezoidal shape. In that respect, the mirrors 22, 24 and 26 are each comprised of a large, front end 28 and a small, back end 30 between opposed first and second edges 32 and 34 with an outside sidewall 36 having an inner surface 38. The front and back ends 28 and 30 are parallel. The tube 20 is made by placing adjacent mirror edges in a contiguous abutting engagement with the first edge 32 of each mirror intersecting the second edge 34 of its adjacent mirror. This forms the tube 20 having a nearly equilateral cross-section along its length. Although not shown in FIG. 3, the inner surface 38 of each mirror 22, 24 and 26 is provided with a reflective finish. The term "mirror" is used to refer to a reflective surface including those made of polished stainless steel, coated plastics, polished glass having a reflective backing and other mirror surfaces. The mirrors are of the "front surface" type which have the reflecting surface of the surface rather than beneath the surface.

FIG. 2 shows a portion of the kaleidosphere 10 in detail. Great triangle AEF is shown along with portions of several abutting great triangles. Triangle AEF includes tubes 12 and 14 which are in turn comprised of three planar mirrors, similar to those shown in FIG. 3, with the front ends of the mirrors comprising tube 12 having lengths G, G and H, while tube 14 is comprised of mirrors having front ends 28 with lengths H, I and I. The lengths are such that $G<H<I$. A typical arrangement might have the approximate ratios for G, H and I of 1:1.165:1.196 with lengths of $G=9.7$ cm, $H=11.0$ cm and $I=11.6$ cm. The back end of the mirrors have similarly proportioned lengths. While not shown in FIGS. 1 and 2, it should be understood that the outside sidewalls comprising the tubes 12 and 14 are laying back-to-back against a correspondingly sized outside sidewall of an adjacent tube. As an example, the sides having a front end of length G is actually comprised of two mirrors having front ends of length G laying back-to-back with the reflective surfaces opposite each other. It is also contemplated by the scope of the present invention that the sidewalls of adjacent tubes 12, 14 can be provided by a single sidewall having its two outer surfaces comprised of a reflective material. This might be the case if the kaleidosphere 10 is made in an injection molding process having the sidewalls coated with a reflective material.

The kaleidosphere 10 of the present invention can be used for a variety of visually pleasing applications. The embodiment shown in FIG. 2 can be small enough to be held in a person's hand or large enough to serve as a piece of furniture or even a part of a building. To fully enjoy the visual effect created by the kaleidosphere 10, an object to be viewed (not shown) is first placed adjacent the small, back ends of the bundle of tubes 12, 14 as at position J. A person then looks at the large, front end of the tubes 12, 14 to see the reflection of the object having the appearance of an inner sphere positioned inside the kaleidosphere 10. No matter where the person stands with respect to the kaleidosphere 10, as long as they are looking at the front ends of the tubes 12, 14, the inner spherical reflection remains positioned inside the kaleidosphere 10.

Figure 4:
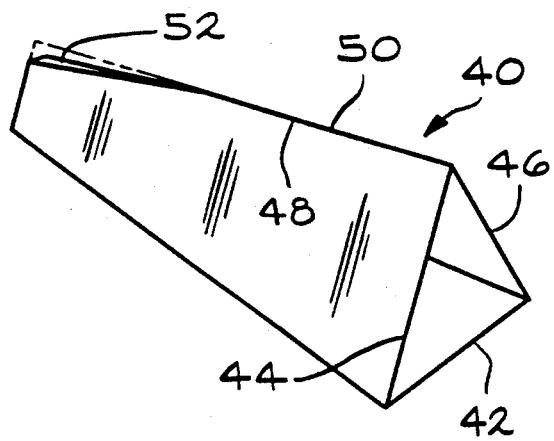

FIG. 4 shows a second embodiment of a reflective tube 40 of the present invention. Tube 40 is comprised of a first, second and third mirrors 42, 44 and 46 mounted together in a similar manner as that shown with respect to representative tube 20 in FIG. 3. A portion of the second and third mirrors 44 and 46, adjacent the abutment of their edges 48 and 50, has been removed and replaced by a small isosceles triangular shaped mirror 52 that closes the space between the mirrors 48 and 50. Isosceles mirror 52 has an inner reflective surface that adds the reflection of a spike to the appearance of the inner sphere that is created by the tube 40. It should be understood that mirror 52 can be replaced by a triangular shaped piece of reflective material, such as a colored plastic sheet material and the like. The shape of the mirror 52 need not necessarily be isosceles but can have virtually any desired shape. The surface 52 can be painted, sand blasted, etched or the mirroring can be removed to allow light and color to pass through the surface 52.

Figure 5:
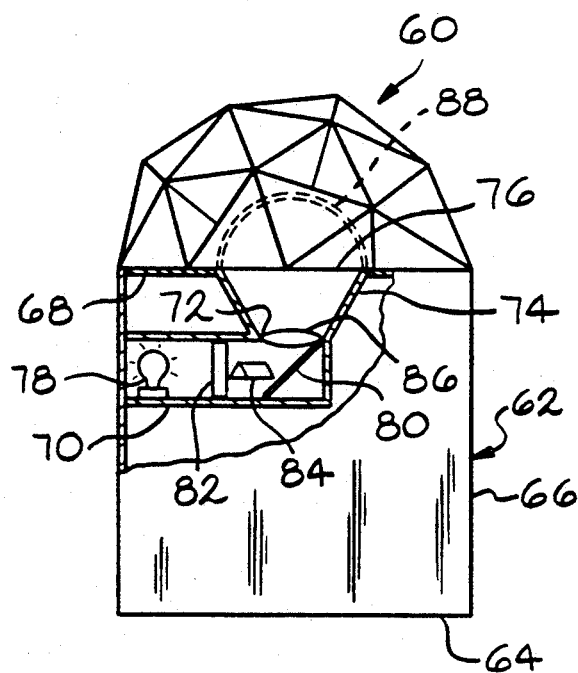

FIG. 5 shows another embodiment of the kaleidosphere 60 of the present invention. The kaleidosphere 60 is hemispherically shaped and is mounted on a projection housing or cabinet 62 comprising a bottom wall 64 with a surrounding sidewall 66 that extends upwardly to an upper plate 68 mounted on the sidewall 66. The plate 68 helps support the kaleidosphere 60, which serves as a cover for the cabinet 62. An elongate, tubular member 70 is mounted on the inside of the sidewall 66 and has an upper opening 72 that meets with a frusto-conically shaped member 74, which increases in diameter upwardly to a circular opening 76 in plate 68. A projection lamp 78 is mounted in the tubular member 70, adjacent the sidewall 66, with a reflective mirror 80 extending from the lower end of the frusto-conical member 74 to a canted position, opposite the projection lamp 78. A rotatable object wheel 82 is mounted adjacent the lamp 78 with a kaleidoscope 84 mounted between the object wheel 82 and the reflective mirror 80. The object wheel 82 is preferably filled with various sizes of loose colored glass and oil. The kaleidoscope 84 is comprised of two reflective mirrors connected along their lengths to form a V-shaped cross-section. The open side between the V-shaped mirrors is covered with black felt material to provide a kaleidoscopic 84. When the lamp 78 shines through the wheel 82, the unique patterns that are produced by the wheel 82 are directed as an endless variety of reflections by the kaleidoscope mirrors 84 against the redirection mirror 80 and through a double-convex prism 86. This creates a truly unique spherical image inside the kaleidosphere 60 as depicted by phantom line 88.

Preferably, the small, inner ends of the kaleidosphere 60 are lined with a sheet of opaque, plastic material (not shown). This plastic material can have a myriad of colors. The object wheel 82 can be connected to a motor (not shown) to continuously rotate the wheel 82. Also, the wheel 82 can be interchangeable so that wheels having different sizes and colors of glass and other reflective objects can be used. Further, a video projector (not shown) can be used in place of the object wheel 82 and kaleidoscope 84. That way, reflected movie images can be seen as a spherical reflection inside the kaleidosphere 60.

Another embodiment of the kaleidosphere 60 and cabinet 62, which is not shown, is provided with an object ball that is mounted on a roller system connected to a motor. The motor spins the rollers which cause the object ball to rotate. A projection lamp similar to lamp 78, shines up through the rotating object ball to form a circular reflection of the ball on the inside of the kaleidosphere 60.

Figure 6:
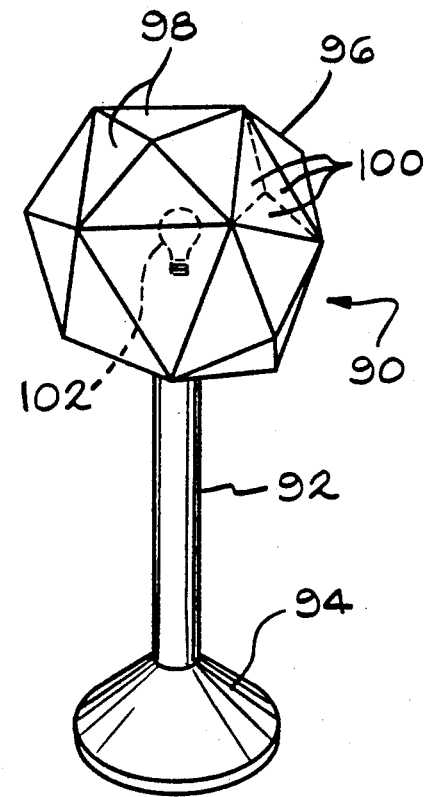
FIG. 6 is a perspective view of a kaleidosphere 96 comprising a lamp 90.

FIG. 6 shows another preferred embodiment of the present invention forming a lamp 90. The lamp 90 is comprised of a cylindrical shaft 92 mounted on a base 94 and extending upwardly to support a kaleidosphere 96. The kaleidosphere 96 shown is comprised of a plurality of reflective tubes 98 having a nearly, but not exactly, equilateral triangular cross-section. These reflective tubes 98 can in turn be subdivided into tubes 100 with a cross-section having angles that are nearly, but not exactly 120°, 30°, 30°. A light bulb 102 is mounted on the shaft 92 and housed inside the kaleidosphere 96. The light bulb 102 creates an inner spherical image inside the kaleidosphere 96.

This embodiment of the kaleidosphere 96 can also be made as a chandelier (not shown). In this case, the kaleidosphere 96 is hung from a support member, such as a ceiling and the like, on the end of a chain.

Figure 7:
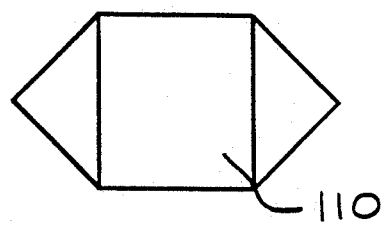
FIGS. 7 and 8 show portions of a spherical shape which are a hexagon or a parallelogram.
Figure 8:
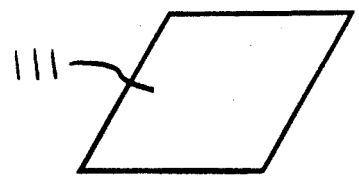
Figure 9:
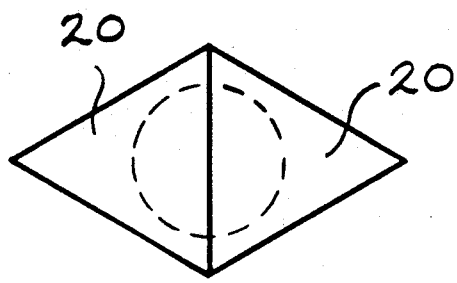
FIGS. 9 to 14 show sets of three-sided tubes which are joined together to form a spherical image.
Figure 10:
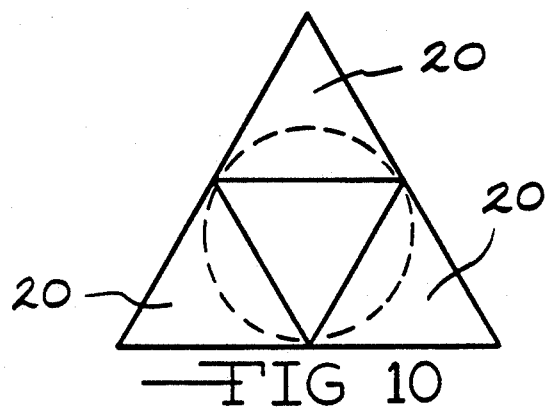
Figure 11:
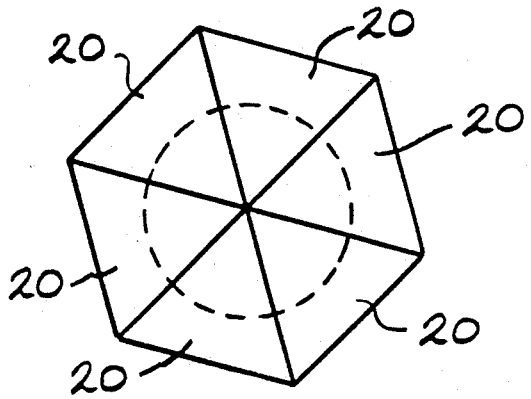
Figure 12:
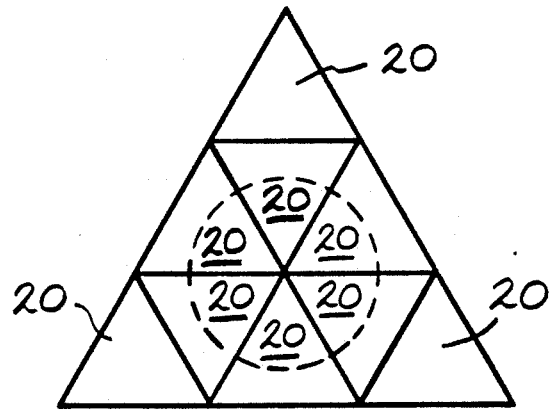
Figure 13:
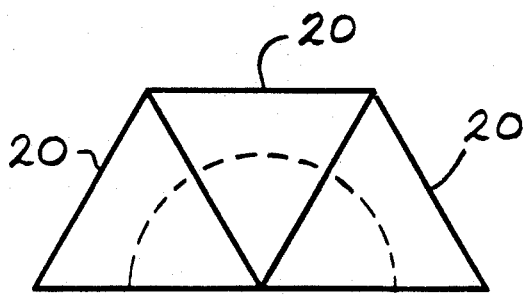
Figure 14:
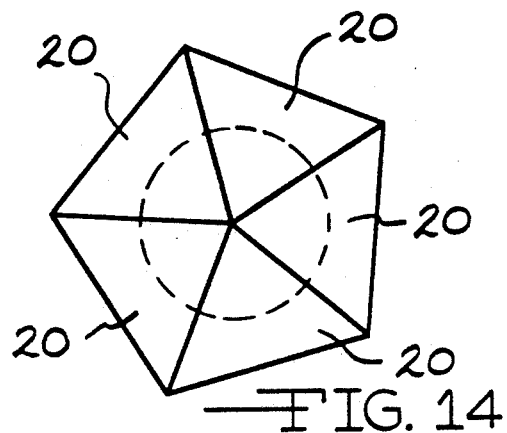

It will be appreciated that a sphere can be divided up into a hexagon (six sides joined together) and triangles 110 or parallelograms 111 (two triangles joined with a diagonal wall removed) and triangles as can be seen from FIGS. 7 and 8 as portions of FIGS. 1 and 2. Other ways of dividing up a spherical surface can be used. It is contemplated that the present invention can include such variations.

FIGS. 9 to 14 show various members of tubes 12 or 14 joined together to form part or all of a spherical image (shown in dotted lines).

It is intended that the foregoing description be only illustrative of the present invention and that the present invention be limited only by the hereinafter appended claims.

I claim:

1. A kaleidospheric device for viewing a reflection of an object to be viewed, which comprises:

at least two open and reflective, tubes, comprised of a plurality of planar members having an outside sidewall and an inner reflective surface facing each other within the reflective tube and with each tube having a large, open viewing end tapering along a length of the tube to a small, open end having a cross-section similar in shape but smaller in area than the large viewing end and wherein the reflective tubes are bundled together with the taper of the tubes aligned in a similar direction so that adjacent outside sidewalls of adjacent tubes are in a contiguous abutting engagement to form a geodesically ordered arrangement of the tubes comprising the shape of at least a partial geosphere as seen at the large end of the tubes, wherein with the object to be viewed placed adjacent the bundle at the small end of the tubes, the reflection of the object at the viewing end of the tubes has the appearance of an image positioned inside the kaleidospheric device.

2. The kaleidospheric device of claim 1 wherein the reflective surfaces of the planar members are first surface mirrors.

3. A kaleidospheric device for viewing a reflection of an object to be viewed, which comprises:

at least two open and reflective, three-sided tubes, comprised of a plurality of planar members having an outside sidewall and an inner reflective surface facing each other within the reflective tube and with each tube having a large, open viewing end tapering along a length of the tube to a small, open end having a cross-section similar in shape but smaller in area than the large viewing end and wherein the reflective tubes are bundled together with the taper of the tubes aligned in a similar direction so that adjacent outside sidewalls of adjacent tubes are in a contiguous abutting engagement to form a geodesically ordered arrangement of the tubes comprising the shape of at least a partial geosphere as seen at the large end of the tubes, wherein with the object to be viewed placed adjacent the bundle at the small end of the tubes, the reflection of the object at the viewing end of the tubes has the appearance of a spherical image positioned inside the kaleidospheric device.

4. The kaleidospheric device of claim 2 wherein the reflective surfaces of the planar members are first surface mirrors.

5. The kaleidospheric device of claim 3 wherein the reflective tubes have a frusto-geometric shape comprised of three substantially trapezoidally shaped mirrors as the planar members that are symmetrically positioned so that each mirror intersects its adjacent mirror to form a triangular cross-section of the tube.

6. The kaleidospheric device of claim 3 wherein the bundle of reflective tubes are mounted on a housing means that supports the tubes and is provided with a projection means that directs an optical image into the tubes.

7. The kaleidospheric device of claim 3 wherein the reflective tubes are made of a plastic material.

8. The kaleidosphere of claim 3 wherein the reflective tubes are bundled together to form the shape of at least a portion of a geosphere as seen at the large end of the tubes and wherein the tubes provide a housing means for a light means to form a lamp means.

9. The kaleidosphere of claim 3 wherein the reflective tubes are bundled together to form the shape of at least a portion of a geosphere as seen at the large end of the tubes and wherein the tubes form a decorative light.

10. A reflective tube that is shaped to form an integral part of a kaleidosphere, which comprises:

three planar members that are symmetrically positioned so that each mirror intersects its adjacent mirror to form a triangular cross-section of the tube with the planar members having an outside sidewall and an inner reflective surface facing each other within the reflective tube and with the tube having a large, open viewing end tapering along a length of the tube to a small, open end having a cross-section similar in shape but smaller in area than the large end, wherein the intersection of any two adjacent planar members forming the tube comprise a portion of a radii of a sphere enclosing the kaleidosphere with an outer radial extent of the intersection at the large end of the tube forming a surface point on the sphere so that the tube thereby forms an integral part of the kaleidosphere surrounded by the sphere and wherein with an object to be viewed placed adjacent to the small end of the tube, a reflection of the object at the viewing end of the tube has the appearance of an image positioned inside the tube.

11. The reflective tube of claim 10 wherein the reflective surfaces of the planar members are first surface mirrors.

12. The reflective tube of claim 10 wherein the planar members are substantially trapezoidally shaped.

13. The reflective tube of claim 10 which can be bundled together with at least two of triangularly cross-sectioned and tapered reflective tubes aligned in a similar direction so that adjacent outside sidewalls of adjacent tubes are in a contiguous abutting engagement forming a geodesically ordered arrangement of the tubes comprising the shape of at least a portion of a geosphere when seen at the large end of the tubes, wherein the object to be viewed is placed adjacent the small end of the bundle of tubes.

14. The reflective tube of claim 10 wherein a tapered opening is provided at the intersection of two of the planar members, extending from the small end of the tube towards the large end, with the opening closed by a similarly shaped member that provides a reflection of the member at the viewing end of the tube.

* * * * *